Dec. 17, 1957 J. A. DUSEK 2,817,003
WELDING GUNS
Filed Nov. 18, 1955
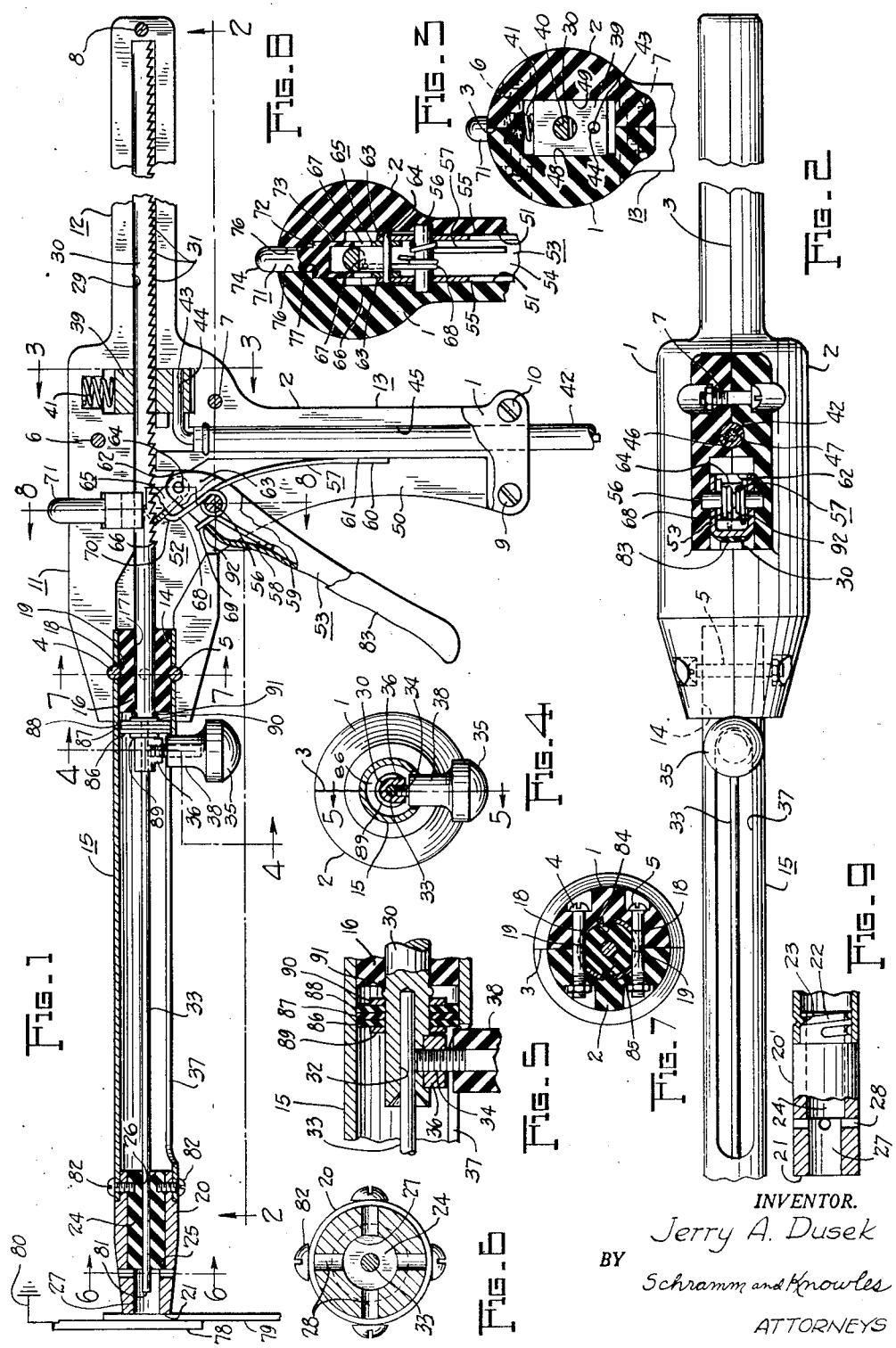
INVENTOR.
Jerry A. Dusek
BY
Schramm and Knowles
ATTORNEYS

United States Patent Office 2,817,003
Patented Dec. 17, 1957

2,817,003

WELDING GUNS

Jerry A. Dusek, Brunswick, Ohio

Application November 18, 1955, Serial No. 547,651

21 Claims. (Cl. 219—130)

This invention relates to electric welding; and relates particularly to electric welding apparatus of the so-called welding gun class, and to methods of welding thereby.

Welding guns in general are used to make various kinds of welds; one of the most important types of which is the so-called spot weld; for example a weld made between the surfaces of two pieces of sheet metal, on a small area or spot of contact between them; and in order to make a concrete disclosure of the invention, in at least one of its uses, it will be described herein as applied to this exemplary use.

The gun invention in the preferred embodiment thereof representing the best known mode of practicing the invention and hereinafter fully described comprises the following; the actual invention being that set forth in the appended claims.

The gun is in the general form of a pistol having a main body and a pistol grip handle thereon; and a trigger in front of the handle; and a gun barrel or tube extending forwardly from the body. The body and tube support an elongated toothed ratchet bar for longitudinal movement therein; and a rod-like electrode is attached at one end to the ratchet bar in rectilinear or axial alignment therewith. The trigger carries a ratchet pawl, spring pressed upon the ratchet teeth. The tube terminates forwardly in a tubular tip, and the forward or free end of the electrode is normally disposed within the tip, but retracted from the end of the tip a predetermined distance. An electric contact brush mounted in the body makes electric contact with the ratchet bar, and therefore with the electrode, and an electric supply wire is connected to the brush and goes to a current supply source, preferably one that is grounded on one side.

In the operation of making a spot weld between a sheet of metal and an underlying metal member which may be of relatively heavy section or between two pieces of sheet metal as referred to, one, the underlying, of the pieces is held stationary and electrically grounded; and the operator, grasping the handle, manipulates the tip to engage it with pressure upon the other piece, which presses the two pieces together with positive pressure at a localized zone. The operator then pulls on the trigger which, acting through the pawl, advances the ratchet bar and the electrode with it, forwardly, moving the end of the electrode from its normal retracted position to engage it with positive manual pressure upon a small area or spot of the work within the pressure zone. Current thereupon flows from the brush through the ratchet bar and the electrode and through the pieces at the small spot area and makes a spot weld between the pieces. The tip end of the electrode is burned off as the weld is completed and in conjunction with the release of pressure on the electrode by the operator breaks the electrical connection. The operator then withdraws the gun bodily.

It is a part of the invention to provide for a normal position of the electrode end, inwardly of the end of the tubular tip, for reasons that will be explained hereinafter. A pawl release device is accordingly provided by which the operator can disengage the pawl from the ratchet teeth, thus freeing the ratchet bar and electrode so that they can be retracted to put the end of the electrode in said normal position at any time and when replacing a used or short electrode with a fresh or long one.

Parts of the gun are made from electrode insulation material and other parts are electrically insulated from each other in such manner that no exposed metal parts can complete an electric circuit from the supply when the gun is laid aside between operations, and so that the gun will not draw arcs from grounded metal articles with which it comes in contact and the hands of the operator when touching exposed metal parts of the gun will not be subjected to burns or shock.

The principal operating parts, including the said trigger, ratchet, pawl, brush, release device, etc. are mounted within the body and for convenience of assembly and access for inspection or renewal, as well as to provide insulation as aforesaid, the body is made from two parts molded from insulating material juxtaposed on a common plane and detachably bolted together.

It is among the objects of the invention to provide a welding gun having features of construction and mode of operation such as described generally above.

Other objects will become apparent to those skilled in the art from a reading of the following description of a preferred embodiment representing the best known mode of practicing the invention, taken in connection with the accompanying drawing forming a part of the specification.

In the drawing:

Fig. 1 is a longitudinal sectional view of the embodiment with some of the parts in elevation and with parts broken away;

Fig. 2 is a bottom plan view of the parts of Fig. 1, with a part of the view in section taken substantially on the plane 2—2 of Fig. 1;

Fig. 3 is a sectional detail view taken substantially on the plane 3—3 of Fig. 1;

Fig. 4 is a sectional detail view taken substantially along the broken line 4—4 of Fig. 1;

Fig. 5 is a fragmentary sectional detail view taken substantially on the plane 5—5 of Fig. 4, to enlarged scale;

Fig. 6 is a sectional detail view taken substantially on the plane 6—6 of Fig. 1;

Fig. 7 is a sectional detail view taken substantially on the plane 7—7 of Fig. 1;

Fig. 8 is a fragmentary sectional detail view taken substantially on the plane 8—8 of Fig. 1; and Fig. 9 is a view, part in elevation and part in section, showing a modification of the tubular tip part of Fig. 1.

Referring to the drawing, there is shown at 1 and 2 two halves of a housing or body molded from thermosetting hard electrical insulation material having respective confronting planar faces disposed together along parting line 3; and recesses inwardly of the faces in the provision of a cavity or chamber, or, as will appear, several internal chambers; and secured together on a common plane of the faces by bolts 4 to 10 inclusive.

The housing comprises a main body portion 11, a rearward body extension 12, and a depending grip handle 13. The main body 11 at its forward part (the left hand part as viewed in the drawing) has a cylindrical open-end recess 14 into which is telescoped the end of a metal tube 15. The tube has an insulation bushing 16 therein provided with an axial bore 17. The bolts 4, 5 pass through parallel apertures or slots 18 in the tube wall and through matching parallel grooves 19 in the sides of the bushing. Besides functioning to clamp the two parts of the body housing together, as mentioned, these bolts also secure the tube in the body and retain the bushing in the tube and the tube in the body locked against displacement axially.

As an arrangement alternative to the use of the bolts 4 and 5 as locating and locking elements which retain the barrel tube 15 and the insulating bushing 16 in predetermined fixed positions relative to one another and to the gun body 11, or as a supplement to such bolts, the body halves 1 and 2 are each formed with integral internal protuberances 84 and 85, respectively, which project toward one another from the opposite sides of the cylindrical socket recess 14. These protuberances are received snugly in matching holes drilled in diametrical relation through opposite sides of the base of the barrel tube 15 so as to effect an interlock between the barrel tube and each of the housing halves 1, 2. The protuberances 84 and 85 are of sufficient length to project not only through the locating holes provided therefor in the base of the barrel tube 15 but also to project into sockets drilled in the sides of the insulating bushing 16 in alignment with the barrel tube holes so as to locate and retain the bushing in desired position in that end of the barrel tube which is received in the housing socket.

The tube or barrel 15 at its forward end has a tubular tip 20 of copper or similar metal. The inner end portion of the tip is reduced in diameter and telescoped into the tube 15, the outer end portion of the tip being tapered to an end 21 of relatively small diameter. The tip 20 may be press fitted into the tube 15 or otherwise permanently mounted thereon as by screws 82 received through holes in the tube 15 and threaded into aligned holes provided therefor in the reduced inner end of the tip and in the insulating guide bushing 24. The tip may be mounted for easier detachment and replacement according to the relatively wide mouthed modification of Fig. 9 in which, as shown, the inner end of the tip 20′ is provided with a coarse thread 22 and the tube 15 has a dimple 23 pressed inwardly from the tube wall and engaged in the thread, whereby the tip may be screwed in or out to attach or detach it.

In either case, Fig. 1 or Fig. 9, the insulation bushing 24 is tightly fitted in the tubular tip abutting upon a shoulder 25 of the tip to position its outer end in spaced relation to the end 21 of the tip, and the bushing 24 has a coaxial bore 26 therein. The spacing of the end of the bushing 24 from the end 21 of the tip provides a cup-form chamber 27 in the end portion of the tip, and the chamber has four radial outlets 28 to atmosphere.

The body extension 12 has a bore 29 formed therein, closed at its rearward end, coaxial with the tube 15 and particularly coaxial with the bores 17 and 26 of the bushings 16 and 24. A ratchet bar 30, preferably made from round metal bar stock, is mounted reciprocably in the extension bore 29 and in the bushing bore 17, and in its most rearward position, illustrated in the drawing, its rear end is stopped upon the closed end of the extension bore 29 and its forward end portion projects through and beyond the bushing bore 17. A series of ratchet teeth 31 are formed on the underside of the ratchet bar 30 and extend over the greater part of the length of the bar.

The portion of the ratchet bar 30 projecting forwardly of the bushing 16 is provided with a coaxial bore 32, into which is inserted the rearward end portion of a round rod-like electrode 33, the forward end portion of which projects through the bushing bore 26, and in the illustrated position of the electrode its forward terminal end 81 is in said chamber 27 and spaced inwardly from the end 21 of the tip a predetermined distance.

The electrode 33 is detachably clamped in the bore 32 of the ratchet bar 30 by means of a radial screw 34 having on its outer end an insulation knob 35 for turning it, the screw being threaded into and through a boss or nut 36 on the under side of the ratchet bar, welded or otherwise secured thereon, and the screw end tightly engaging the electrode.

The wall of the tube 15 on its under side has a rectilinear longitudinal slot 37 of uniform width therein, and the knob 35 has a shank 38 of reduced diameter and of electrically insulating material projecting through the slot. During reciprocations of the electrode 33 and ratchet bar 30 in the tubular barrel, the knob shank 38 reciprocates therewith in the slot 37 and the shank, by its engagement with the sides of the slot, prevents rotation of the electrode 33 and ratchet bar 30, whereby the ratchet teeth 31 are maintained on the under side of the ratchet bar and the smooth round side of the bar is maintained uppermost for engagement by the spring biased contact block or brush, as will appear hereinafter.

As a means for guiding and centering the forward end of the ratchet or rod carrying bar 30 when the latter is advanced forwardly through the barrel 15, a bushing comprising flat circular insulating discs 86, 87 and 88 is received about the carrier bar adjacent the boss or nut 36. A metal washer 89 smaller in diameter than the insulating washers and which is located against the boss 36 and a similar washer 90 which is held in predetermined position and against sliding on the carrier bar 30 as by staking 91 confine the insulating discs 86, 87, 88 and cause such discs to travel with the bar 30 back and forth in the barrel tube 15 as the carrier bar is advanced and retracted. The circular peripheries of the discs have snug sliding engagement with the inside walls of the barrel tube to obtain positive centering of the carrier bar and thereby prevent contact between the carrier bar and the metal barrel tube 15.

The electrode 33 and the ratchet bar 30 are thus supported in rectilinear alignment in the axially aligned bushing bores 17 and 26 and the extension bore 29, and are reciprocable therein in unison.

An electric contact brush 39 of the solid metal block type has a round hole 40 through which the ratchet bar passes. A spring 41 abutting the upper side of the brush 39 holds it downwardly to make sliding electric contact with the smooth round upper side of the ratchet bar 30 as it moves longitudinally.

An insulated wire 42 for supplying direct electric welding current has a bare end portion 43 secured in a hole 44 in the brush 39 and thence goes downwardly through passage 45 in the handle 13 and out therefrom to be connected to a source of current that has one side grounded.

The two halves 1 and 2 of the housing body are formed with confronting recesses 46, 47 that form the passage 45 to house the insulated wire 42; and matching confronting recesses 48, 49 contoured to guide and enclose the copper or other suitable metal block brush 39 and its spring 41 and hold the brush stationary longitudinally and laterally of the ratchet bar but loosely and with clearance above and below which allow it to be fed downwardly by the spring 41 as it wears and to maintain good electrical connection between the parts.

The forward part of the handle 13 is formed with a forwardly open handle recess 50 having spaced parallel confronting side walls 51, and the recess 50 continues upwardly into a downwardly open body recess 52; and in all longitudinal positions of the ratchet bar 30, some of its teeth are in the body recess.

A stamped metal handle trigger 53 is provided forwardly of the handle 13 convenient to be pulled rearwardly by fingers of an operator grasping the handle. An insulating cover 83 of plastic or rubber material is provided on the trigger as by dipping in a liquid solution or suspension and curing, to eliminate the possibility of electrical connection between the carrier bar and the fingers of the operator. The trigger 53 is generally of channel form, having a web 54 and side flanges 55 and is positioned with the flanges extending rearwardly. A pin 56 is projected through aligned holes in the trigger flanges 55 near the upper end of the trigger, the ends of the pin being locatingly received and retained in aligned socket recesses molded in the confronting side walls 51 of the handle recess 50 so as to provide a hinge pivot for the trigger.

A wire spring 57 having turns around the pivot bolt 56 has one free end 58 engaging the trigger channel web 54 as at 59 and the other free end 60 engaging the bottom of the handle recess as at 61, the spring being stressed to yieldingly hold the trigger rotated clockwise to the position illustrated, the trigger being stopped and located by its upper end engaging a portion of the housing as at 62.

The web 54 of the channel form trigger is terminated at 92 so that the channel flanges 55 thereat become upwardly extending spaced apart ears 63, and a pivot pin 64 is projected through these ears and bridges them and a ratchet pawl 65 is pivotally mounted on the pin. The pawl 65 is made of channel form, having a web 66 and side flanges 67 and the pivot pin 64 goes through aligned holes in the flanges. The ratchet pawl 65 extends in an upwardly forwardly inclined direction from its pivot pin 64 and is constrained toward clockwise rotation by a wire spring 68 having turns around the pivot pin and one free leg 69 engaging the termination 92 of the trigger web 54 and the other free leg 70 engaging the pawl. The outer termination of the channel web 66 of the pawl is held yieldingly by the spring 68 against the ratchet bar teeth 31 and constitutes the ratcheting part of the pawl. The side flanges 67 of the pawl straddle the lower half of the ratchet bar 30 and extend upwardly along opposite sides thereof.

A pawl release device, shown generally at 71, is provided, made from insulating material and comprising a square sectioned head 72 having two legs 73 extending downwardly and straddling the upper half of the ratchet bar, and normally resting upon the side flanges 67 of the pawl; and the head 72 has a post 74 extending upwardly therefrom. The head 72 and post 74 are held upwardly by the spring pressed pawl and are trapped loosely in confronting recesses 76 in the housing parts 1, 2 which are formed to hold the legs 73 in position with respect to the pawl, and the upper side of the head engages shoulders 77 of the recesses 76 which limit upward movement of the head and trap the device in the housing and maintain the straddling of the ratchet bar by the legs. The post 74 extends upwardly out of the housing recesses and its terminus constitutes a push button which may be depressed by the operator to cause the legs 73 of the release device to move the spring pressed pawl downwardly to free it from the ratchet teeth.

In the operation of the gun as thus described, it is assumed that a spot weld is to be made between two work pieces of sheet metal juxtaposed on each other as shown at 78, 79. The piece 78 is assumed to be stationary and it is electrically grounded as indicated at 80. The gun is held by the operator by means of the handle 13 and he presses the end 21 of the tip 20 against the work piece 79 with rigid manual pressure, thus making a zone of pressure between the work pieces. End 81 of the electrode 33 is at this time at its said predetermined distance from the end 21 of the tip 20 as described. The operator then pulls the pivoted trigger 53 toward the handle. The pawl 65, pivoted on the trigger, spring pressed in engagement with one of the teeth 31 of the ratchet bar 30 and being upwardly and forwardly inclined, is moved forwardly bodily with the upper end of the trigger, and moves the ratchet bar 30 and electrode 33 forwardly, and this engages the end 81 of the electrode with the work piece 79 with rigid manual pressure on a small area within the pressure zone.

Upon contact of the electrode end with the work, electric current flows from the source through the wire 42 to the brush 39 and thence through the ratchet bar and electrode to the work piece 79, and thence through the small area of contact between the work pieces 79, 78 and to the grounded work piece 78, welding the pieces together at the small area of contact between them.

The welding gun of the present invention using an electrode rod 33 of self fluxing type such as Lincoln Selfweld available commercially from Lincoln Electric Co., Cleveland, Ohio, and about $\frac{1}{16}$ inch to about $\frac{1}{8}$ inch in diameter, usually and preferably about $\frac{3}{32}$ inch in diameter, can readily handle and operates most satisfactorily at a welding current of about 120 to about 140 amperes, usually an optimum current of about 130 amperes being used, the potential being maintained in the neighborhood of about 50 volts D. C., a range of from about 40 volts to about 60 volts D. C. being satisfactory. Each welding operation in the usual situation normally consumes about $\frac{1}{8}$ inch to about $\frac{3}{8}$ inch, normally about $\frac{3}{16}$ inch of the welding or electrode rod 33, the consumed portion being burned off at the tip end 81 by reason of the heat produced at the point of contact between the work and the rod end. This burning off of the rod end automatically interrupts the current flow at the completion of the weld, although it is understood, of course, that the operator can interrupt the welding current at will by manipulation of the gun to withdraw the electrode rod from the work and thereby break the electrical connection. The burning away of the tip end of the rod presets the device for the next welding operation, since the shortening of the rod has the effect of locating the new end in a position spaced inwardly from the end face 21 of the arc confining tip 20 (or 20') so that in positioning the tip against the work for a succeeding welding operation the rod tip 81 is held away from the work surface until positively driven into operative contact by the operator manipulating the trigger 53. The operator then withdraws the gun bodily for movement to the site of the next welding operation.

It is a part of the invention that the end 81 of the electrode, when not making a weld, is always in a normal pre-operative position retracted into the chamber 27 and spaced a predetermined distance from the plane of the end face 21 of the tubular tip 20. In other words, it is normally in a safe position whereby the electrode will not prematurely contact the work when the gun is operated to make a weld, and whereby there is no liability that the electrode end will be exposed and make electric contact with outside metal parts when the gun is laid aside out of use.

At the end of the welding operation described, the electrode end 81 may be forwardly beyond said normal position. To restore it to its normal position for the safety purposes referred to, or preparatory to making another weld, the operator presses the push button 74 and this rocks the pawl downwardly and disengages it from the ratchet teeth. The ratchet bar thus being rendered free or floating, the ratchet bar and the electrode may readily be retracted rearwardly by the operator until the electrode end 81 is in its normal predetermined position. This retraction of the electrode is preferably accomplished by manipulating or drawing rearwardly on the knob 35 which the operator may use as a grip in manipulating the gun. The push button 74 is then released to restore the pawl.

At each welding operation, some of the end 81 of the electrode will be consumed by the arc and the electrode will gradually become shorter, and as its end 81 is repeatedly restored to its said normal position, the ratchet bar will gradually take up positions farther and farther forwardly. The ratchet bar is made long enough and thereby provides a series of teeth long enough, so that there will be teeth engageable by the pawl when the greater part of the electrode has been consumed and the ratchet bar is in its most forward position, and so that the bar will not move forwardly out of the brush. The remnant of the electrode may then be removed and a fresh electrode installed by manipulating the knob 35 as described.

When the wire 42 is connected to the current source, the brush 39, ratchet bar 30 and electrode 33 become electrically alive; but by means of the electrical insulation provided by the bushings 16 and 24 and knob 35 and push button 74, and by the material of the housing, these alive parts are electrically isolated so that there is no liability that electric contact will be made therewith when the gun is laid aside between operations, nor liability that the operator will contact them and be subject to burns or shock.

What I claim and desire to secure by Letters Patent of the United States of America is:

1. In a welding gun, a housing body having tubular elements extending forwardly and rearwardly therefrom in rectilinear alignment, an elongated toothed ratchet bar and an elongated rod-form electrode detachably connected end to end in rectilinear alignment and supported for longitudinal reciprocating movement within the tubular elements and body, the body provided with a grip handle, ratcheting mechanism including a pawl engaged with the teeth of the ratchet bar and a lever pivoted in the body, said lever having an inner end connected to the pawl and an outer end disposed for springing movement to and from the handle and operable by an operator grasping the handle to move the bar and electrode forwardly, and a pawl release device recessed in and guided for relative movement by the body and projecting outwardly therefrom, said release device being operable by the operator to temporarily disengage the pawl from the teeth to permit the bar and electrode to be moved rearwardly.

2. A welding gun comprising a housing provided with a handle, a trigger adjacent to the handle supported on the housing for movement toward the handle by an operator grasping the handle, a tube projecting from the housing forwardly thereof in a position of use of the gun and its forward end being free and engageable with pressure upon work to be welded by pressure applied by the operator on the handle, an elongated ratchet bar having a longitudinal series of teeth supported in the housing for longitudinal movement, an elongated electrode connected at one end to the ratchet bar and disposed within the tube and movable longitudinally by movement of the ratchet bar to engage the free end of the electrode with the work, a ratchet pawl engaging the teeth and operable by trigger movement to move the ratchet bar and electrode forwardly, the electrode having a normal longitudinal position prior to said forward movement in which its free end is spaced inwardly from the end of the tube, and means enabling the electrode and bar to be moved longitudinally at any time to put the electrode end in said normal position, comprising operator-operable means to temporarily disengage the pawl from the ratchet teeth.

3. A welding gun as described in claim 2 and in which the teeth are on one side of the ratchet bar and the other side is smooth and an electric brush is mounted on the housing and is connected to a source of current and makes sliding contact with the smooth side of the bar in all longitudinal positions of the bar.

4. A welding gun comprising a housing, a tube projecting from the housing, an elongated round ratchet bar having a longitudinal series of ratchet teeth on one side thereof and supported for longitudinal movement in bearings on the housing, mechanism including a ratchet pawl supported on the housing at the toothed side of the ratchet bar and engaged with the ratchet teeth and operable to move the bar longitudinally, an elongated rod-form electrode disposed longitudinally within the tube and having mechanical connection at one end with the ratchet bar for longitudinal movement therewith, said connection comprising clamp means on the ratchet bar operable by a handle to clamp the electrode to the bar, means preventing rotation of the ratchet bar in its bearings to keep the ratchet teeth and pawl engaged, said means comprising a longitudinal guide slot in the wall of the tube through which the clamp means handle projects.

5. A welding gun comprising a housing, a tube projecting from the housing forwardly in a position of use of the gun, a bushing in the tube spaced from its forward end to provide a cup-form chamber in the end of the tube, an elongated rod-form electrode disposed coaxially within the tube extending through the bushing at its forward end portion and having a free end normally in the chamber and in a predetermined position spaced inwardly from the end of the tube, an elongated ratchet bar smooth on one side and a longitudinal series of teeth on the other side and disposed in rectilinear alignment with the electrode and supported in the housing for longitudinal reciprocating movement, an electric brush supported in the housing by means preventing longitudinal movement thereof engaged by the smooth side of the bar and connected to a current supplying conductor, a mechanical connection between the rearward end of the electrode and the forward end of the ratchet bar constraining them to move longitudinally in unison, a ratchet pawl in the housing spring pressed to engage the ratchet teeth, operator-operable mechanism carried by the housing to move the pawl bodily forwardly to cause it to propel the ratchet bar and connected electrode forwardly, an operator-operable pawl release means in the housing for temporarily removing the pawl from the teeth to permit the bar and electrode to be moved rearwardly to dispose the end of the electrode in said predetermined position.

6. The gun described in claim 5 and in which the said mechanical connection comprises a clamping device carried by the ratchet bar, operable to clamp the electrode to the bar, and having an operating handle projecting outwardly through a longitudinal guide slot in the wall of the tube.

7. A welding gun comprising a body and a handle thereon, a tubular tip carried by the body manipulatable by the handle to pressure-engage the end of the tip with work to be welded, an electrode having an end normally in a retracted position spaced from the end of the tip, mechanism associated with the electrode operable by an operator gripping the handle comprising means to move the electrode end toward the tip end to engage it with the work, insulated means extending into the body for connecting the electrode to an electric circuit for energizing the electrode, and the mechanism also comprising means operable to release the electrode from the moving means and thereby render the electrode restorable to its retracted position independently of the electrode moving means.

8. An electric welding gun comprising a hollow housing body, a tubular slotted barrel carried by the body, an elongated electrically conductive carrier bar, insulators mounting the carrier bar for endwise sliding movement in the body and barrel, means carried by the body and slidable on the carrier bar for maintaining electrical connection with the carrier bar during sliding movement of the latter and in all positions of such bar, an elongated electrode rod aligned with the carrier bar and projecting through the tubular barrel, insulating means carried by the barrel and guiding the electrode rod, means carried by the body and actuatable to effect incremental endwise movements of the bar, and means secured to the carrier bar and projecting through the barrel slot for releasably securing the electrode rod in fixed relation to the carrier bar.

9. An electric welding gun comprising a hollow housing body, a tubular barrel carried by the body, an elongated electrically conductive carrier bar extending through the body and barrel, insulating means supporting the carrier bar in insulated relation in the body and barrel, said insulating means including an insulator mounted on the carrier bar and movable therewith for longitudinal sliding movement within and in contact with the barrel, an elongated electrode rod disposed in alignment with the carrier bar so as to project axially through the tubular barrel, means carried by the body embracing the carrier bar and connectible to a source of electric welding current for maintaining electrical connection between such current source and the carrier bar in all positions of the latter, means releasably clamping the welding rod to the carrier bar for movement in unison, and means carried by the body and actuatable to effect incremental endwise movements of the carrier body.

10. An electric welding gun comprising a hollow housing body, a tubular metal barrel carried by and projecting from the body, an elongated electrically conductive carrier bar, means mounting the carrier bar for reciprocating endwise movement within the body and barrel, said carrier bar being formed at one end to receive the end of an elongated electrode rod and to retain such rod in end to end relation and within the tubular barrel, a clamping element for securing the rod and bar together, an actuating knob secured to the clamping element for manipulating the latter in removing and replacing electrode rods, and the tubular barrel being formed with an elongated slot to accommodate the knob in all positions of longitudinal movement of the carrier bar, the knob having an insulating portion disposed within the slot of the tubular barrel to eliminate electrical connection between the carrier bar and the tubular barrel.

11. An electric welding gun comprising a two part hollow housing body of electrical insulating material, the parts being matched halves secured together and disposed on opposite sides of a parting plane, a tubular barrel carried by the body, the body being formed with a socket recess and the barrel having one end secured in such recess, an elongated electrically conductive carrier bar located internally of the body and barrel, insulating means supporting the bar for endwise movement in the body and barrel, contact means carried by the body and embracing the carrier bar for maintaining sliding electrical connection with the carrier bar in all positions of the latter, spring means holding the contact means yieldingly against the carrier bar, means carried by the body and actuatable to effect incremental endwise movements of the carrier bar, said movement effecting means including a trigger pivoted in the body and located for manipulation by the fingers of an operator grasping the body, said carrier bar being formed at one end to receive an elongated electrode rod in axial alignment with the carrier bar and with the electrode rod projecting longitudinally through the tubular barrel, said barrel being formed with an elongated slot, and clamping means on said one end of the carrier bar and including an insulating knob projecting through the slot for movement along the length of the slot as the carrier bar is moved in the barrel, said clamping means being manually actuatable externally of the tubular barrel and in all positions of the carrier bar to release an electrode rod for withdrawal from the carrier bar and to grip a replaced electrode rod.

12. An electric welding gun comprising a complemental pair of members of insulating material disposed against one another in face to face relation to provide an elongated body and a laterally extended handle, the confronting faces of the members each being recessed to define an interior chamber, a tube having one end portion received between the body members and projecting forwardly therefrom, an elongated conductive carrier bar received between the body members and guided and insulated thereby for endwise reciprocating sliding movement along a predetermined rectilinear path in coaxial relation to the tube, a contact element supported within and completely enclosed by the body members and disposed against and to maintain electrical contact with the carrier bar during sliding movement of the latter, an electrical conductor extending into the body recess and attached to the contact element for connecting the latter to a source of electrical energy, an elongated rod-form electrode disposed in the tube, means detachably securing the electrode to the carrier bar in end to end relation and for endwise movement in unison along said path, insulating means supported in the tube in fixed relation, said insulating means surrounding and guiding the carrier bar at said one end of the tube and the electrode at the forward end of the tube, ratcheting means carried by the body and coacting with the carrier bar to effect stepwise advancement of the latter forwardly along said rectilinear path and concurrent movement of the electrode toward and through the forward end of the tube, said tube being formed with an elongated slot paralleling the path of the electrode and the carrier bar, and means fast to the carrier bar and projecting laterally through the tube slot for manual manipulation in advancing and retracting the carrier bar and an electrode secured thereto along said path.

13. An electric welding gun as in claim 12 wherein the forward end of the carrier bar is formed with a socket to receive the electrode end and the laterally projecting means for advancing and retracting the electrode manually comprises a knob having an element threaded into the forward end of the carrier bar to bear against the received end of an electrode in the socket to effect said detachable securement of the electrode to the carrier bar.

14. An electric welding gun as in claim 13 wherein the knob has an insulating neck portion disposed in the tube slot and guided by the walls of such slot to resist rotative movement of the carrier bar about the sliding axis of the latter.

15. An electric welding gun as in claim 12 wherein the body members are formed with aligned fastener openings normal to the meeting plane of their confronting faces, a fastener in such opening securing the body members together, the tube being formed with a notch in said one end portion, and the fastener being engaged in said tube notch to hold the tube captive between and prevent its rotation in and relative to the body members.

16. An electric welding gun as in claim 15 wherein the insulating means in said one end of the tube is formed with a notch and the fastener is engaged in it to resist endwise and rotative movement of such insulating means in and relative to the tube.

17. An electric welding gun as in claim 12 wherein the chamber formed in the confronting faces of the body members includes a pocket portion having an external opening and a release member is held captive in such pocket portion, said release member being engageable with the ratcheting means and projecting through such opening for external manual actuation in holding the ratcheting means inactive to permit manual advancement and retraction of the carrier bar and electrode.

18. An electric welding gun as in claim 12 wherein the chamber formed in the confronting faces of the body members includes a pocket portion surrounding the carrier bar and having spaced confronting walls normal to the path of the carrier bar, the contact element comprising a metal block disposed in the space between the confronting walls of the pocket and formed with an aperture through which the carrier bar is received.

19. An electric welding gun as in claim 18 wherein the contact element is slidable in the pocket in a plane normal to the carrier bar path and resilient means is held captive in the pocket and reacts against the body and the contact element to bias the latter against the carrier bar.

20. An electric welding gun as in claim 12 wherein an elongated tubular extension of insulating material projects axially from the rear end of the elongated body, said extension being aligned with the carrier bar to receive the latter upon retraction, and the end of the extension remote from the body being closed by insulating material and constituting a stop engageable by the carrier bar to limit retraction of the latter.

21. An electric welding gun as in claim 12 wherein the carrier bar is separated from the internal wall surface of the tube by an annular clearance space, and a circular element of insulating material is secured on the forward end of the carrier bar for sliding engagement with the tube wall in guiding the carrier bar and centering it in the tube.

References Cited in the file of this patent

UNITED STATES PATENTS

| | | |
|---|---|---|
| 2,430,055 | Kennedy | Nov. 4, 1947 |
| 2,498,241 | Bowen | Feb. 21, 1950 |
| 2,673,278 | Anderson | Mar. 23, 1954 |

FOREIGN PATENTS

| | | |
|---|---|---|
| 367,360 | Germany | Jan. 20, 1923 |
| 809,333 | Germany | July 26, 1951 |